US006987707B2

(12) United States Patent
Feintuch et al.

(10) Patent No.: US 6,987,707 B2
(45) Date of Patent: Jan. 17, 2006

(54) METHOD AND SYSTEM FOR IN-AIR ULTRASONIC ACOUSTICAL DETECTION AND CHARACTERIZATION

(75) Inventors: Paul L. Feintuch, San Dimas, CA (US); Francis A. Reed, Anaheim Hills, CA (US); Michael Cox, Corona, CA (US); Ronald A. Borrell, Corona, CA (US)

(73) Assignee: General Dynamics Advanced Information Systems, Inc., Arlington, VA (US)

( * ) Notice: Subject to any disclaimer, the term of this patent is extended or adjusted under 35 U.S.C. 154(b) by 0 days.

(21) Appl. No.: 10/712,805

(22) Filed: Nov. 12, 2003

(65) Prior Publication Data

US 2005/0058021 A1    Mar. 17, 2005

Related U.S. Application Data

(60) Provisional application No. 60/425,618, filed on Nov. 12, 2002, provisional application No. 60/479,168, filed on Jun. 17, 2003.

(51) Int. Cl.
*G01S 15/04* (2006.01)
*G01S 15/06* (2006.01)

(52) U.S. Cl. ........................................... 367/99; 367/87

(58) Field of Classification Search .................. 367/87, 367/93, 99, 103; 73/625, 628
See application file for complete search history.

(56) References Cited

U.S. PATENT DOCUMENTS

| | | | |
|---|---|---|---|
| 3,771,116 A | 11/1973 | Farrah | |
| 3,803,603 A | 4/1974 | Perot | |
| 4,112,756 A | 9/1978 | MacLennan et al. | |
| 4,451,909 A | 5/1984 | Kodera et al. | |
| 4,456,982 A | 6/1984 | Tournois | |
| 4,703,440 A | 10/1987 | Birk et al. | |
| 4,731,762 A | 3/1988 | Hanks | |
| 4,953,141 A | 8/1990 | Novak et al. | |
| 4,972,385 A | 11/1990 | Teel | |
| 4,975,889 A | 12/1990 | Petrucelli et al. | |
| 5,062,088 A | 10/1991 | Davidson et al. | |
| 5,067,115 A | 11/1991 | Wada | |
| 5,161,125 A | 11/1992 | Maccabee | |
| 5,206,652 A | 4/1993 | Hoyt et al. | |
| 5,287,331 A | 2/1994 | Schindel et al. | |
| 5,295,119 A | 3/1994 | Sarac | |
| 5,337,053 A | 8/1994 | Dwyer | |
| 5,341,346 A | 8/1994 | Youlton | |
| 5,453,932 A | 9/1995 | Brabec | |
| 5,526,321 A | 6/1996 | Kim | |
| 5,577,006 A | 11/1996 | Kuc | |
| 5,608,689 A | 3/1997 | Capell, Sr. | |
| 5,615,174 A | 3/1997 | Arnaud et al. | |
| 5,652,594 A * | 7/1997 | Costas | 342/93 |
| 5,914,912 A | 6/1999 | Yang | |
| 5,930,201 A | 7/1999 | Cray | |

(Continued)

*Primary Examiner*—Ian J. Lobo
(74) *Attorney, Agent, or Firm*—Michael J. Bell; Howrey LLP

(57) ABSTRACT

A system and method are presented for determining the detection and location of persons and objects using ultrasonic acoustic sensors. The system allows detection of stationary and moving persons and other objects, through atmospheric conditions, to a distance of at least 300 feet. The invention further provides for enhanced signal processing through the use of arrays of transmitters and receivers, where one or more transmitter arrays may be oriented substantially perpendicularly to one or more receiver arrays, allowing high directionality and good rejection of reverberations, background noise, clutter and objects not of interest.

27 Claims, 13 Drawing Sheets

U.S. PATENT DOCUMENTS

| | | |
|---|---|---|
| 5,943,295 A | 8/1999 | Varga et al. |
| 6,070,832 A | 6/2000 | Redd |
| 6,097,669 A * | 8/2000 | Jordan et al. .................. 367/99 |
| 6,202,034 B1 | 3/2001 | Li |
| 6,222,479 B1 | 4/2001 | Honigsbaum |
| 6,268,803 B1 | 7/2001 | Gunderson et al. |
| 6,289,327 B1 | 9/2001 | Woodsum et al. |
| 6,304,179 B1 | 10/2001 | Lotito et al. |
| 6,323,441 B1 | 11/2001 | Hager et al. |
| 6,326,886 B1 | 12/2001 | Hoffsommer |

* cited by examiner

METHOD AND SYSTEM FOR IN-AIR ULTRASONIC ACOUSTICAL DETECTION AND CHARACTERIZATION

This application claims the benefit under 35 USC § 119 of U.S. Provisional Applications No. 60/425,618 filed Nov. 12, 2002 entitled "System for Acoustical Characterization" and No. 60/479,168 filed Jun. 17, 2003 entitled "Method and System for In-Air Acoustical Detection and Characterization," both of which which are incorporated herein by reference.

GOVERNMENT RIGHTS

The government has certain rights in this invention pursuant to Contract No. F33615-01-C-6016 awarded by the Department of the Air Force.

BACKGROUND OF THE INVENTION

1. Field of the Invention

The invention in general relates to detection systems, and more particularly to a system for determining the location of persons and objects via acoustic sensors.

2. Background

A variety of methods and systems exist for surveillance around buildings and ground assets. One method used to protect the perimeter around a critical facility from stealthy intruders is to post sentries and trip-wire alarms, or to instrument critical areas with video cameras and have guards monitor the screens. Both of these methods are too human intensive for a large perimeter, and system performance is vulnerable to fatigue by the guards faced with a tedious task. The modern trend is toward remote sensing of the entire perimeter to provide automated alerts to which sentries can then be directed, and otherwise complement the performance of human assets. Further, remote sensing coupled to automated alerts can lower the cost to defend a perimeter by lowering the number of human sentries required.

In general, a single sensor type does not provide sufficient detection coverage for the full variety of expected targets. For example, a quiet stealthy intruder on foot is more difficult for a passive acoustic sensor to detect than it is for an IR sensor. Several current intrusion alert systems use video, radar, infra-red, and passive acoustic sensors. All have varying degrees of problems with excessive numbers of false alarms. Specific weaknesses associated with these systems, in addition to the high false alarm rates, are very limited detection ranges (especially for stealthy intruders), and a lack of automatic threat localization and tracking. Thus these systems could be enhanced with an additional sensor type that can provide automatic detection coverage for quiet slowly moving intruders out to about two hundred feet and that can help resolve true from false targets among the multiple reports.

Perimeter surveillance systems may use a passive acoustic capability, in the band of human hearing, to provide covert sensing, target signature recognition, lines of bearing to contacts and effective information presentation to an operator. Complete dependence on passive acoustics, however, places some limitations on overall system performance. Passive sensing alone will not provide adequate detection and localization performance against a stealthy human intruder, as they move slowly, on foot, and are trained to be virtually undetectable.

In other fields, active ultrasonic acoustic systems have been developed which provide short-range measuring applications such as airbag systems, construction measurements, proximity warning systems, body imaging, and robotics, such as described in U.S. Pat. No. 5,577,006 to Kuc and U.S. Pat. No. 6,268,803 to Gunderson et al. Most of these acoustic applications are intended for indoor use and operate at ranges less than 20 feet. None of the previous applications of the ultrasonic acoustic detections in air were concerned with extending the operating range of the system for identifying targets to several hundred feet, nor do they use complex transmit waveforms, array processing or sophisticated signal processing techniques to improve signal to noise ratio (SNR) and thus increase the range at which the active echo could be detected. While long range active sonar array systems are known for underwater applications, similar approaches have not been introduced into air-acoustic systems because of, among other reasons, the different characteristics of air versus underwater acoustic environments.

Thus, to date the systems based on air-acoustic detection and characterization either rely on limited passive systems at human audio frequencies, or are directed at limited ultrasonic applications like short-range distance measurement or imaging, and have not attempted to address issues like long-range detection using active air-acoustic systems at ultrasonic frequencies.

SUMMARY

An embodiment of the invention includes an ultrasonic air-acoustic transmitter and an air-acoustic sensor. In combination the devices are able to detect objects at a range of several hundred feet. The air-acoustic transmitter and air-acoustic sensors may be configured in arrays of transmitters and receivers to increase performance. Additionally, the invention provides for a unified system of multiple transmitters and sensors working together to detect objects more accurately and over a larger area. Further, the invention provides computer analysis through signal- and post-processing of the signal returns (i.e. reflected waves or signals that are detected at the acoustic sensors).

One embodiment of the invention includes a new approach to improved surveillance capabilities for facilities and ground assets. One means of reducing false alarms in such systems is the simultaneous use of multiple air-acoustic sensors that overlap in coverage but depend upon different target or environmental characteristics for detection. Combining or fusing the scenes developed by the individual sensors can then reduce false alarms. This embodiment introduces ultrasonic active acoustic in-air sonar to enhance the performance of multi-sensor remote surveillance systems. This ultrasonic active in-air sonar can be integrated with other surveillance sensors such as passive acoustic, IR and video sensors to provide more robust, capable surveillance coverage. An active ultrasonic detection system, operating above the range of human hearing, can detect stationary or moving stealthy intruders out to a range of two hundred feet or more, without alerting the intruder, and provide an automatic localization and tracking capability. It can also reduce false alarms prevalent in passive systems, and while passive sensors provide only bearing to a target, the active acoustic system measures target direction, range and range-rate. It would therefore allow for the detection of extremely quiet human intruders that are either moving or stationary and would do so without directly alerting them. It would also in no way affect the lower frequency passive listening portion of the system and the use of it at any time by the command post to have a virtual presence in the field.

DRAWINGS

The invention may be more readily appreciated from the following detailed description, when read in conjunction with the accompanying drawings, in which.

DETAILED DESCRIPTION

The present invention provides a system and method to extend perimeter detection through the use of an in-air active acoustic system. According to one embodiment of the invention, this is accomplished through the novel use of active acoustic sensors that operate at ultrasonic frequencies for long-range in-air detection. Ultrasonic frequencies are generally frequencies above those audible to humans, typically above 20 kHz. Transducer arrays are used for beamforming and signal processing techniques are used for detection and target characterization. These signal processing techniques are more advanced than range determination. As discussed below in more detail, the features and combination of features herein have not been developed in the past for reasons including a lack of information regarding in-air environmental ultrasonic characteristics, ultrasonic noise sources, ultrasonic target reflectivity or ultrasonic array development.

Figure 1:
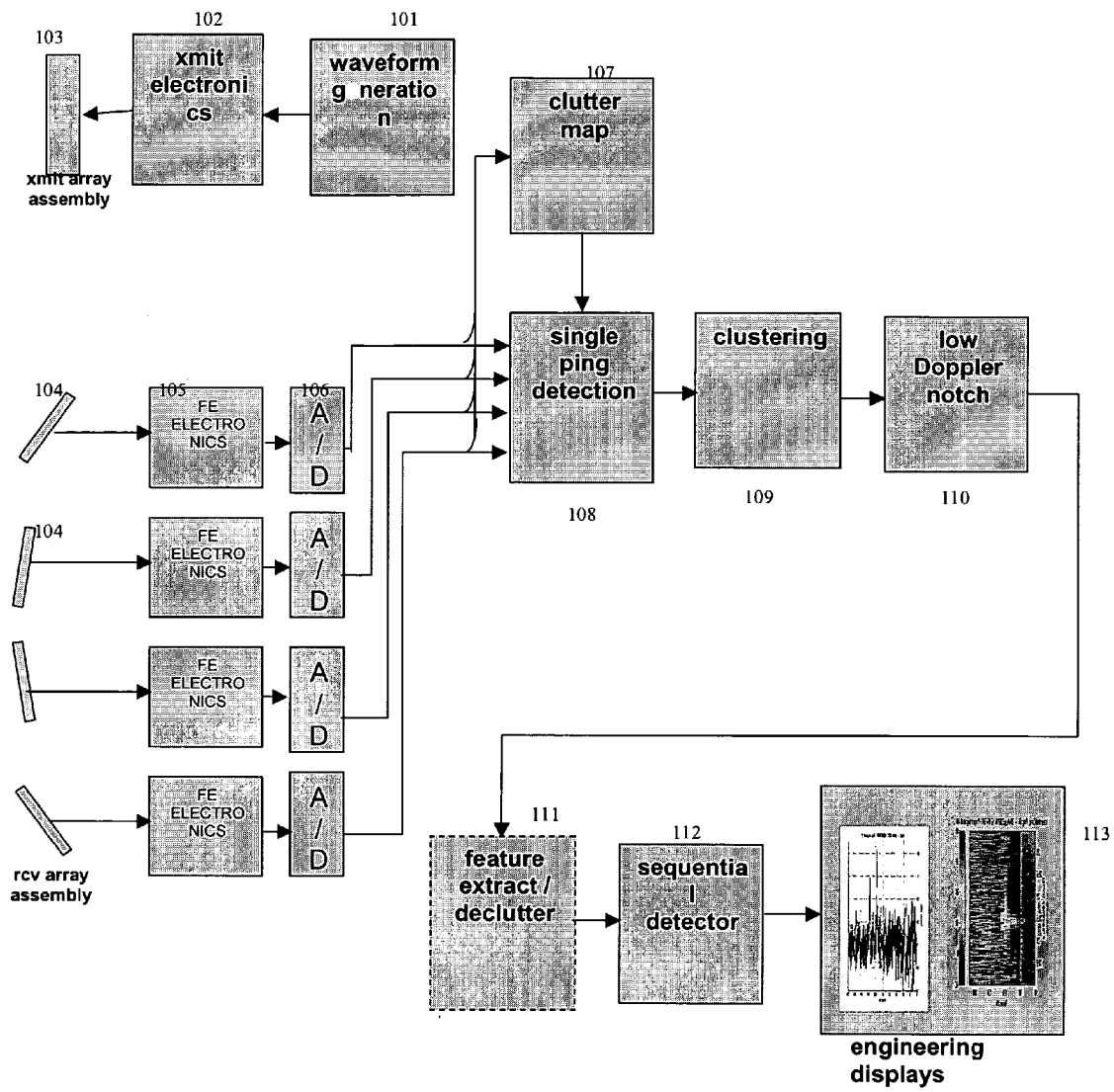
FIG. 1 is a block diagram of an active air-acoustic system including a transducer array and a signal processing platform.

An embodiment of the invention may be better understood by reference to FIG. 1. The performance of an active system depends on a variety of factors. The source frequency and power level need to be selected based on the environment, the efficiency of the source, and the target reflectivity. Characterization of a target generally involves measuring or modeling the amount of energy that is reflected from stealthy intruders. The basic signal return in active air-acoustics (sonar) is a plane wave reflection that correlates with a delayed and possibly frequency shifted version of the transmitted signal. The plane wave property is the result of the target being relatively concentrated in the environment, and can be modeled as a point reflector in the far field of the receiver. This allows spatial filtering to be performed that can help reject energy from directions other than the direction of interest for the target. This spatial processing may utilize a conventional beamformer that produces main lobes in the desired steering directions and low sidelobes to reject energy from other directions. Sometimes there is a need for more sophisticated beamformers that adapt to the environment to reject strong plane wave energy from other directions. These are referred to as adaptive beamformers.

There are a variety of noise sources that can mask reflections from an intruder. They should all typically be considered, and some of them are related to the transmitted signal itself. There is of course background ambient noise that exists everywhere. This can vary in level dramatically depending upon just how quiet the locale is at the time. For example, a quiet forest or rural area would present a much lower noise floor to the system than an urban area or an airport. One can also expect there to be backscattering of the active transmission. This source of noise is called reverberation and is primarily from large diffuse reflecting regions such as boundaries like the ground or dense foliage. Another form of backscatter/clutter, is more specular or distinct, and comes from smaller reflectors that are very localized and almost point-like. Clutter returns behave like targets in many ways since they are plane waves that correlate with the transmitted waveform. They can, for example, be echoes from trees or small structures or equipment. In the perimeter protection mission, the sensors and most clutter are in general stationary, while the target moves into and around in the field of view. It is therefore possible to characterize much of the clutter during known non-intruder conditions. One embodiment employs a Clutter Map, which is an estimate of the background reflections during a non-target period, used to normalize the background.

These returns can then be ignored, and the system can detect changes to the normal background. Such changes may occur as animals wander into the area being protected. The signal processing to detect human intruders will typically initially declare these to be threat targets. They will have to be eliminated from consideration by classifying them based on other properties. These properties can be extracted by over-resolving the target structure to detect highlights. The highlights reflected from a human intruder will have a different shape or extent than those of an animal intruder. They may also move differently, and exhibit some natural radiated sounds that could help distinguish them from threats. They should typically be dealt with in the post-detection processing portion of the system. The post-processor characterizes the threats, vehicles, and other reflectors likely to be encountered with clues about their size and expected motion. A feature classifier and motion tracker are then used to decide whether the returns are threat related.

Another source of noise expected in an active system for remote monitoring is plane wave interference. This is strong acoustic radiated energy in the band of the active sonar receiver from other directions than the direction that the beam is steered to for threat detection. It is not correlated with the transmitted waveform, but it can be strong enough to come through the matched filters that are matched to the transmitted waveform and mask the target return. It is planar, but from a different direction than the transmitted signal. Because of this directional property, it may be rejected spatially, using conventional or adaptive beamform ing. Airplanes taking off or landing within the perimeter being monitored are likely examples of this type of interference. Those directions will have to have large amounts of rejection, perhaps even nulls, in the spatial response.

Table 1 summarizes some of the design considerations for the application of active sonar to the remote detection problem.

stationary or slow moving targets can be limited by reverberation rather than background noise, because they fall within the ridge of reverberation response in the low Doppler region of the range-Doppler map. Distinct objects can also reflect back energy and appear as targets. These false targets are referred to as clutter, and post processing is used to distinguish clutter from true targets. This processing

TABLE 1

Considerations for Application of Active Sonar to Remote Auditory Detection

| PROPERTY TO BE CHARACTERIZED | SONAR TERMINOLOGY | LIKELY CAUSE | TYPICAL PROCESSING |
|---|---|---|---|
| Reflectivity of intruders and non-threats | Target strength | Size, surface hardness, aspect angle | Use matched filters looking for correlation with the transmitted signal |
| Diffuse ambient noise | Background noise level | General background in the area | Use an array of sensors and form beams with low sidelobe responses in directions that are not of interest |
| Diffuse non-moving backscatter from the surrounding terrain | Reverberation | Boundaries such as the ground or foliage | Use Doppler processing so that if the targets move they are away from the zero Doppler reverberation |
| Concentrated threat-like backscatter | Clutter | Trees, out-buildings, animal intruders, non-threat traffic | Look for clues in shape or motion or other sounds |
| Directional ambient noise | Plane wave interference | Strong concentrated radiated noise, such as airplanes, road traffic, or machinery associated with the base infrastructure such as electric generators, etc. | Spatial nulling using adaptive cancellation or adaptive beamforming |

Turning to FIG. 1, an in-air active acoustic system according to one embodiment of the invention is illustrated. An array of radiators (transducers) and microphones is used for transmitting and receiving sound. The array provides signal gain, directivity, and rejection of unwanted noise. In some cases an array with fixed spatial response does not reject enough of the unwanted interference, and adaptive beamforming may be advantageously used to provide further nulling of the noise. The receive system includes signal conditioning, dynamic range control, digital conversion, digital receive beamforming, and filtering of the resulting multiple beams.

The active detector matches filters to delayed and frequency shifted versions, of the transmitted waveform. A typical active sonar display will be a range-Doppler map including of the matched filter outputs for each of the resolution cells corresponding to different range and frequency shifts.

For active sonar, there are many returns that are not due to random noise, but instead are due to reflections back from the environment. When a distributed region around the target scatters back to the receiver, this backscatter is referred to as reverberation. In the ocean this can occur in the water volume, or at the surface or bottom boundaries. The reverberation comes back from stationary scatterers and is therefore at zero or very low Doppler shifts, depending on the motion of the receiver, its beam sidelobes and waveform ambiguity functions. If the target is moving relative to the receiver, then its Doppler shift will move it out of the reverberation on the range-Doppler map. The detection of involves examining the structure of the active sonar return for distinct features or clues that are representative of targets or non-targets.

A useful measure of the performance of a sonar is the signal-to-noise ratio available at the output of the array for subsequent signal processing for detection or estimation. The performance is characterized by active sonar equations, which predicts the available signal-to-noise ratio that the system provides for detection of the target and estimation of its location and identifying characteristics. Table 2 illustrates an active sonar equation stated in terms of decibels.

TABLE 2

Active Sonar Equation

ACTIVE SONAR EQUATION:
$SNRAV = SL - 2TL + TS - (NL - DI) - RL$ where
SNRAV = signal-to-noise ratio available to the receiver
SL = source level of sound source in decibels relative to 1 microPascal ($\mu Pa$), the unit of sound intensity
TL = transmission (propagation) loss in dB, one way from source to target or target to receiver
TS = target strength in dB of active sonar target, related to its sound reflectivity
NL = noise level at receiver in dB re 1 $\mu PA$ (assumed to be omnidirectional)
DI = directivity index of receive array in dB, amount by which the array rejects the omnidirectional noise
RL = reverberation level at the receiver Applying the equation of Table 2, it can be seen that the available signal-to-noise ratio for active sonar is the transmitted signal power decreased by the two-way propagation loss, modified by the target reflectivity, compared to the noise power at the output of the directional receiver.

The field of underwater sonar has developed performance prediction techniques based upon the sonar equation, and the terms in the sonar equation have many parametric dependencies and environmental sensitivities. A tremendous amount of effort has been spent over the years to understand this behavior in the ocean for systems that detect, targets such as submarines and mines. For the acoustic detection of human intruders in air, the amount of characterization data is very limited, and has been independently gathered via experimentation in the process of developing the embodiment of the present invention. Table 3 shows how some of the sonar equation terms may vary as a function of system or environmental parameters.

TABLE 3

Parametric Dependencies of Terms in the Sonar Equations

| Term | Characterization |
| --- | --- |
| SL | active: transducer efficiency, power, operating frequency; passive: target type, speed, location |
| TL | frequency, range, sound refraction, weather, season, attenuation |
| TS | frequency, target size, aspect orientation, composite structure |
| NL | frequency, location, BW, density of other traffic, weather, biologics |
| DI | frequency, array geometry, correlation properties of the noise |
| RL | source level, scattering strength, pulse length, beam widths on both transmit and receive |

Figure 2:
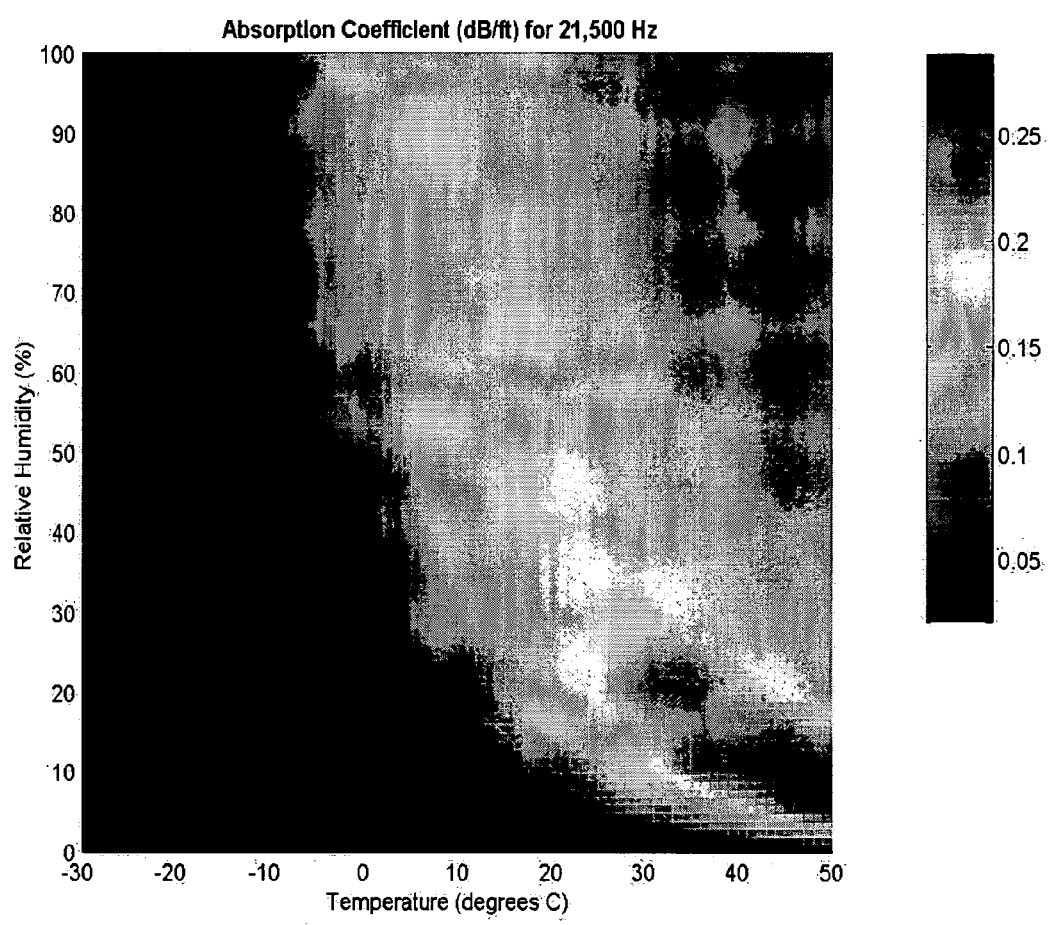
FIG. 2 illustrates the absorption coefficient based on the humidity and temperature used by an embodiment of the present invention.

FIG. 2 illustrates the absorption coefficient versus temperature and humidity for waveforms of 21,500 Hz. From this figure one can see that the range of absorption coefficient values from 0.12 to 0.22 covers the large majority of typical temperature/humidity values. Very little can be done to mitigate the impact of absorption. One may lower the frequency but eventually the frequency enters the audible frequencies and the covert nature of the system is lost. It is important to understand the impact of the absorption to realize that the system performance will change drastically from one month to another and, to a lesser extent, across the course of a day as the temperature and humidity fluctuate. The data from this figure is used by the system in situ to adjust the parameters of the present invention to take into account the temperature and humidity of the area under surveillance. An embodiment of the present invention provides for sensors to determine the humidity and temperature of the area under surveillance and a mechanism to provide these values to a processing unit.

The use of an in-air active sonar for area surveillance includes characterization of the sources, environments, and targets. In the active sonar case at ultrasonic frequencies, most of the parameters needed for evaluating the performance via the active sonar equation have not been investigated. In one embodiment of the invention, a system for measuring the parameters of the environment and the targets, and to characterize detection performance, includes:
1. multiple transmit elements that are coherently combined to form a transmit beam;
2. variable operating ultrasonic frequencies to measure sensitivity across the band;
3. single frequency and frequency swept transmit waveforms to detect stationary (low Doppler) and moving (high Doppler) targets in background reverberation;
4. multiple receive elements coherently combined to form receive beams with array gain, directivity, and interference rejection;
5. active sonar signal processing, performing the waveform matched filtering to form a range-Doppler map of the active sonar returns;
6. active sonar data processing (employing clutter mapping to normalize non-uniform background responses, followed by a sequential detector to accumulate target returns from multiple pings), and active decluttering (employing feature estimation on clusters of returns to classify real from false targets);
7. a range-Doppler display of the active sonar response in different beams (directions) for an initial operator interface; and
8. extension to automatic detection and alerting for input to a future data fusion system incorporating similar results from other sensors.

Additional design elements for embodiments of the invention may include any combination of the following:
1. The absorption of sound in air increases dramatically as the operating frequency is increased. Thus for the longest detection range the ultrasonic system should transmit at just above the audio band, i.e. in the 20 to 25 KHz region. If higher resolution is needed and shorter ranges can suit the situation, then the frequency can be increased accordingly.
2. There are inexpensive commercial ultrasonic transducers on the market. These element outputs can be used to make the transmit array, and the gain and phase stability of the elements supports the formation of a transmit beam with increased source level over that of a single sensor.
3. The existing inexpensive commercial ultrasonic transducers on the market cannot be used for receive directional beamforming because the elements typically are physically too large and do not have sufficient gain and phase stability to form directional beams. Instead, one implementation uses low cost acoustic microphones that normally are operated in the audio band. The sensors within these microphones have significant response in the ultrasonic band, but this is usually not used since it is beyond the range of human hearing. The filters and pre-amplifiers can be changed to process the outputs of these sensors only in the ultrasonic band of interest, resulting in a very low cost receive array with gain and phase stability across the elements that supports the formation of directional beams.

Turning back to FIG. 1, each of the components and modules of an embodiment of the invention are described below. The components and modules may include hardware (including electronic and/or computer circuitry), firmware and/or software (collectively referred to herein as "logic"). A component or module can be implemented to capture any of the logic described herein. The transmitter includes waveform generator module 101, transmit electronics module 102, and transmit array module 103. The receiver includes a receive array module 104, front end electronics module (that includes signal conditioning and dynamic range control) 105, and an analog to digital converter module 106. The subsequent signal processing includes clutter mapping module 107, single ping detection module 108, clustering module 109, a low Doppler notch filter module 110, feature extraction module 111, sequential detection module 112 and generation of displays module 113.

Figure 9:
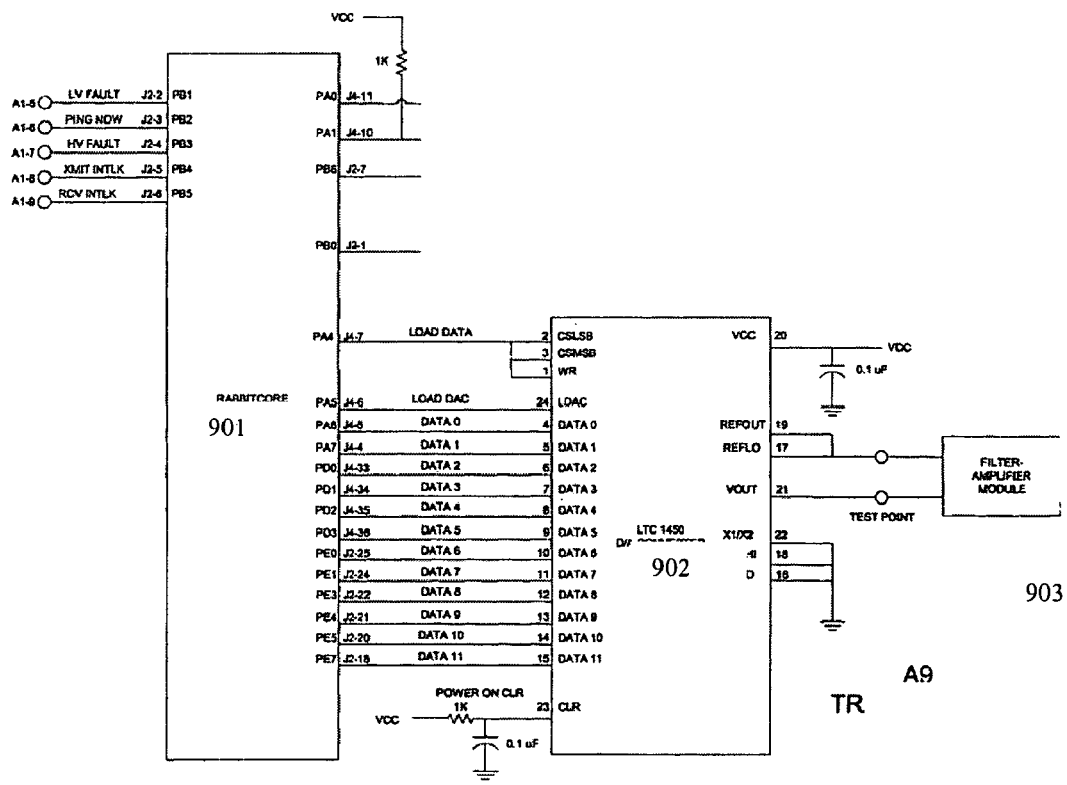
FIG. 9 illustrates a schematic for one embodiment of a portion of the transmitter of the present invention.
Figure 10:
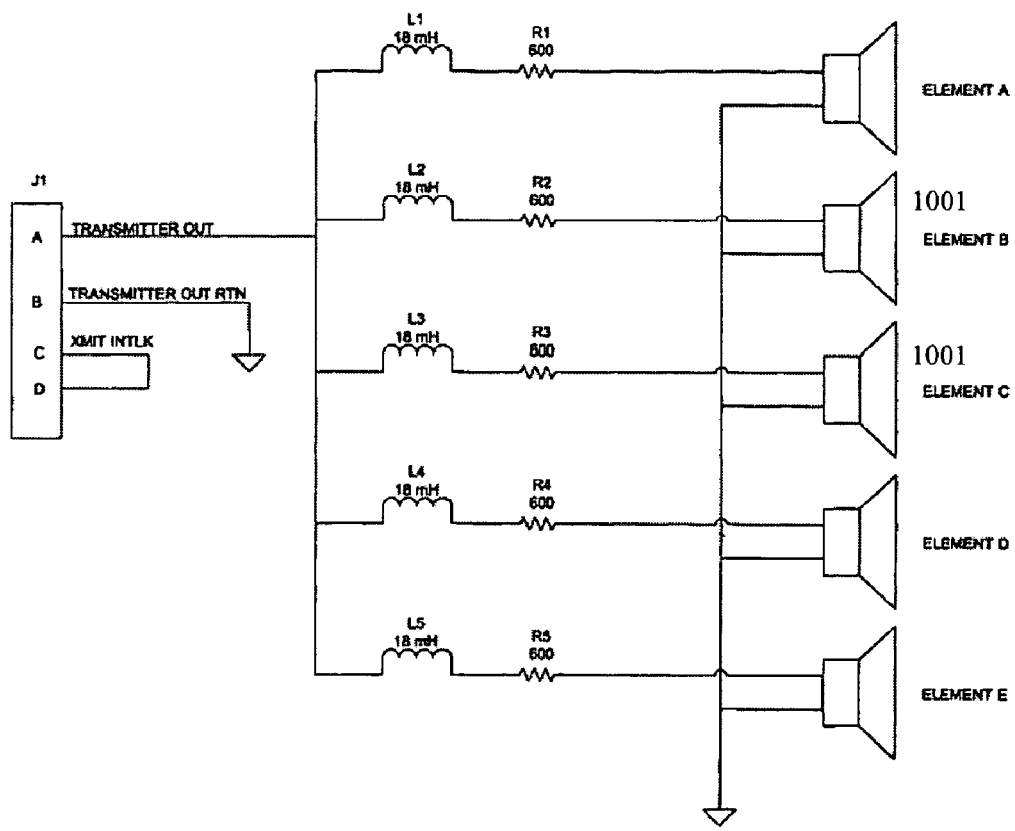
FIG. 10 illustrates a schematic for one embodiment of the transmitter array of the present invention.

One embodiment of the transmitter is described in FIGS. 9 and 10. The waveform generator 901 stores versions of narrowband sinusoidal (or continuous wave (CW)) signals, or broadband swept hyperbolic frequency modulated (HFM) signals and digitally generates the desired waveforms (selected from a set of shaped CW or HFM pulses of various pulse lengths) at a preselected sample frequency. The waveform generator is a logic module. The digital waveform data is transformed to an analog signal with a digital to analog converter 902. The resulting analog signal is filtered to eliminate signal content outside the frequency band of interest with a Band-Pass Filter. The filtered transmit signal is then amplified with amplifier 903, and output to the Transmit Array described in FIG. 10. The Transmit Array may be a single transducer 1001, an array of transducers, or multiple arrays. In all configurations, the elements of the transmit array are capable of coupling the high power waveform signal into high levels of ultrasonic acoustic energy in the air. The array of transducers provides an increase in total transmitted power as well as spatial directivity of the transmission that allows the transmit energy to be focused substantially in a single desired direction and minimized in other directions. The waveform generator may produce several waveforms that are concatenated wave into a wavetrain. One example of a such a concatenated waveform would be the use of a CW waveform for rapidly moving targets, a long-duration HFM waveform for distant slow moving or stationary targets and a short-duration HFM waveform for close in or slow moving targets, i.e. first generating a CW waveform followed immediately by a short duration HFM immediately followed by a long duration HFM. Immediately can mean within a very short time duration, optimally less than a millisecond.

Figure 11:
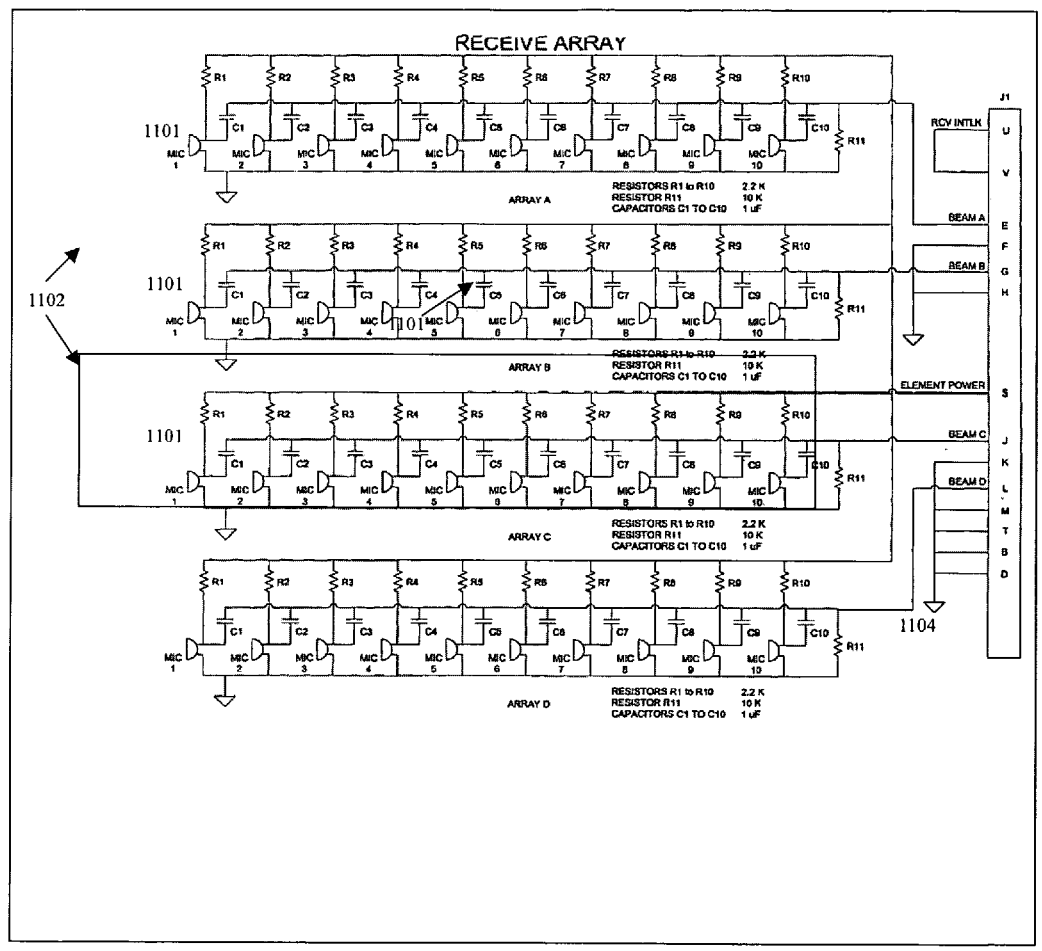
FIG. 11 illustrates a schematic for one embodiment of the receive array of the present invention.

An embodiment of the receiver is described in FIG. 11. The Receive Array 104 for receiving ultrasonic-signals may be a single receive sensor, an array of sensors, or multiple arrays. The array electronics provide an analog filter to reject out of band signals and provide gain to scale the signals to be within the dynamic range of the analog to digital converter. The array of transducers provides spatial filtering to reject waveforms from undesired directions and to provide signal gain. The output signals from the receive array are amplified and filtered with low noise microphone preamplifiers 105, 1101 and transformed to a digital form with an analog to digital converter 106.

An embodiment of the signal processing procedure is described below. The signal processing includes single ping detection module 108 and creation of a clutter map by module 107. The first step in the processing sequence after the received data has been digitized and passband filtered is single ping detection in module 108. This refers to the processing performed to produce the individual resolution elements supported by the waveforms and determining the presence or absence of a signal in those elements. This processing includes matched filtering with overlap to reduce scalloping between range bins. An overlap of 75% is used in an embodiment of the invention. In order to map the matched filter output bins to signal-to-noise, a representation of the noise background is developed by creating a clutter map over multiple pings by averaging the range maps (HFM waveforms) and range-Doppler maps (CW waveforms) over a large number of pings. This clutter map is calculated periodically or whenever something in the environment changes substantially. Dividing the clutter map into the single ping range or range-doppler maps produces resolution cells that are proportional to signal-to-noise ratio. The resolution elements are compared to a threshold, with those exceeding the threshold assumed to contain a useful signal. It should be noted that because of the high range resolution of the HFM waveform and the high doppler resolution of the CW, the system may over-resolve a contact, producing threshold crossings in multiple resolution elements. ("Over-resolve" may in general refer to receiving more than the minimum data necessary to resolve a feature to a predetermined resolution.) The post-processing includes processing to group these multiple threshold crossings into individual detections (i.e. correlate or modify the signals to refer to a single target or feature) and reject false alarms based on their spatial and temporal characteristics (for instance, rejecting as false alarms signals that are not closely associated in time or position).

The post processing includes clustering module 109, a low Doppler notch 110, feature extract/declutter module 111, a sequential detector module 112, and display processing module 113. The clustering function groups multiple threshold crossings that are in close enough proximity to one another so that they represent the overresolved echo return from a single object. The low Doppler notch is a filter that rejects low Doppler CW detections, since actual targets exhibiting Doppler as low as this are moving slowly and are more effectively detected using the HFM waveform. The feature extract/declutter module or logic 111 detects a variety of predetermined cluster characteristics that can be used to discriminate which echo returns are from actual targets of interest. Such cluster characteristics can include shape, energy contents and/or other physical characteristics of reflected acoustic waves that correspond to features of a target. The output from module 111 includes in one embodiment digital information or data packets encoded to represent such cluster characteristics which are transmitted to the sequential detector 112.

The sequential detector module 112 performs a method which integrates returns over multiple pings in order to reduce or eliminate returns due to background noise and to efficiently detect target returns. One embodiment of a suitable sequential detector sequential detector module 112 is further shown in FIG. 3 and described below. The integration to reduce background noise can be carried out by summing, averaging, normalizing or otherwise processing the received signals to increase the target-signal-to-background ratio.

In post-processing, outputs from the preceding stages (received via sequential detector module 112) are rendered by display logic (which may be integrated into the engineering displays module 113) and are either thresholded for automatic detection alerts, or displayed for visual observation by an operator. Information can be displayed in a variety of ways depending on the actual application and the needs of the operator.

Figure 3:
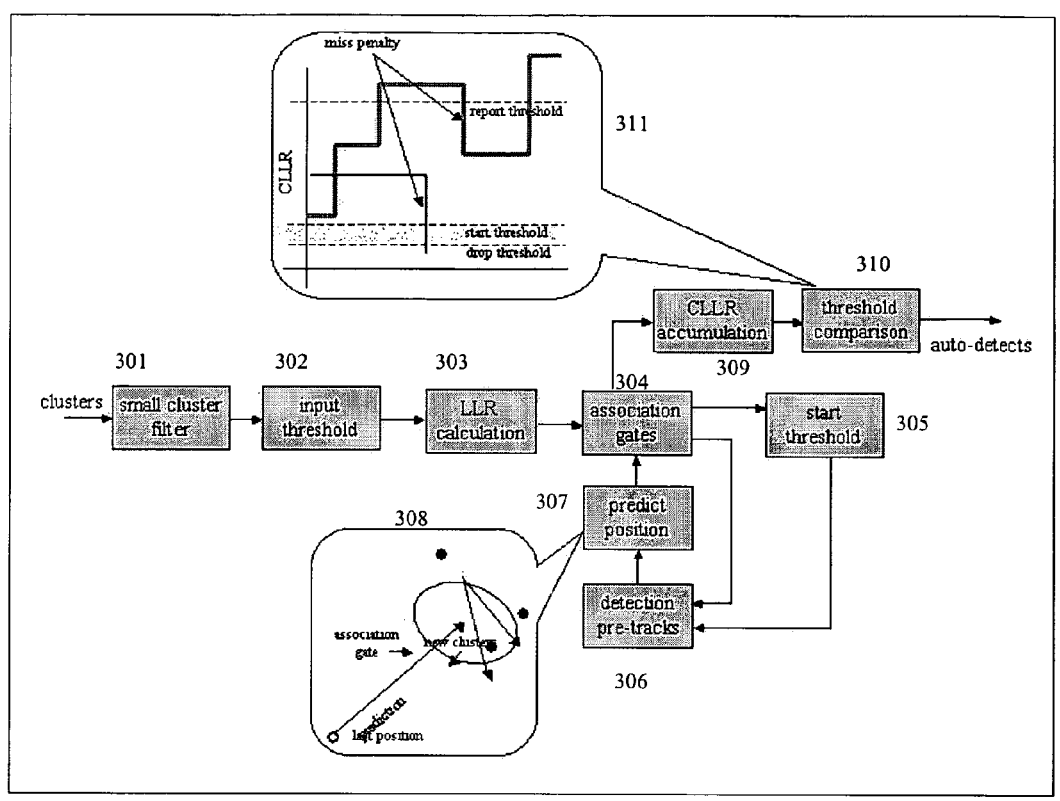
FIG. 3 is a block diagram of the post-processing of the received signals of an embodiment of the present invention.

FIG. 3 describes the post processing for this system, the function of which is to take the detections from the signal processor and preserve those threshold crossing that were due to real targets and remove those from false targets. Proper setting of all the parameters present in this portion of the processing includes evaluation and tradeoffs of characteristics such as detection performance, false alarm rates and association of target returns across multiple pings. Evaluation of these characteristics for real data was used to select values for post processing parameters such as: cluster gap sizes, cluster size limitations, detection thresholds, sequential detector association gates, sequential detector likelihood parameters, sequential detector missed opportunity penalty and sequential detector thresholds.

For the purposes of this discussion the modules in FIG. 3 are referred to as follows: small cluster filter module 301, input threshold module 302, LLR calculation module 303, association gates module 304, start threshold module 305, detection pretracks module 306, predict position module 307, CLLR accumulation module 309, threshold comparison module 310.

The initial filter module 301 removes clusters that include of one or two detected cells that are smaller than targets. The next step in the processing is an amplitude threshold module 302. If this threshold is too low then many false alarms will pass through the automatic detection system. If it is too high then targets may be eliminated. The goal is to lower this threshold as much as possible in order to increase the probability of detecting a target, to within the limits of the subsequent processing at removing non-targets or clutter. The subsequent processing processes multiple pings to reach an automatic detection decision. In this case a sequential detector is used, but other combining techniques can be used as well. The sequential detector includes of modules 303 through 309. The first step is to determine the log likelihood ratio (LLR) of each cluster. The LLR is the logarithm of the ratio of two likelihood functions: one is the probability that the received echo occurred assuming the presence of an actual target, while the other is the probability the received echo occurred assuming no target was present. A common detection strategy is to compare this LLR to a threshold after a fixed number of pings in order to decide whether to declare a detection. Alternatively, in the sequential detection approach used here, a cumulative LLR (CLLR) 308 is updated after each ping and the CLLR is compared to two different thresholds 309. If the CLLR is greater than the report threshold, a detection is reported; if the CLLR is lower than the drop threshold it is considered a non-detection event and removed from further consideration. If the CLLR is between the two thresholds, no decision is made. For a desired set of probability of detection (Pd) and probability of false alarm (Pfa) values, a sequential detector produces fewer pings (on average) to call a detection then a detection strategy based on a fixed number of pings. The CLLR is calculated for a sequence of clusters associated across multiple pings 304. After each ping, new clusters are compared to existing cluster sequences to determine whether they should be associated with an existing track or pre-track. Parameter adjustments can be made to the algorithm used to predict future positions 307 as well as the size of the association gates used to identify which new clusters are "close" enough to associate with an existing pre-track. Clusters that do not associate with an existing pre-track are used to initiate new pre-tracks if they are above a start threshold 305. The CLLR of pre-tracks 306 that are not updated with a new cluster are decremented by a "miss" penalty so that after some number of pings without an update the pre-track will be dropped. Parameters such as the various thresholds, the miss penalty and the association gates can be carefully chosen based on expected target motion as well as characteristics of the waveforms. Parallel strategies can be implemented that simultaneously search for both slow moving and rapidly moving targets. The slow moving targets are those detected with the short or long broadband (HFM) waveforms, while the rapidly moving targets are those detected with the narrowband (CW) waveform.

Figure 4:
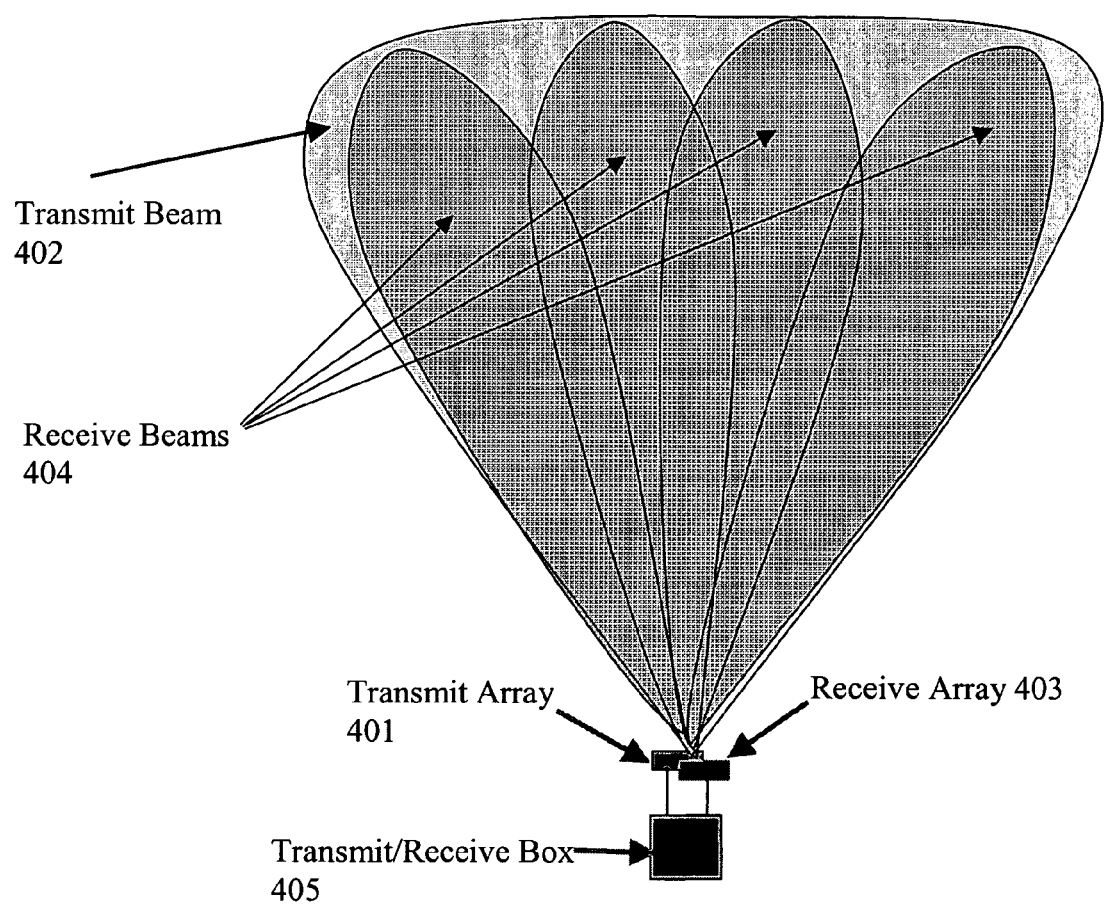
FIG. 4 illustrates an exemplary deployment used by an embodiment of the present invention.

FIG. 4 illustrates an exemplary deployment used by an embodiment of the present invention. In this embodiment there is one transmitter array 401 to transmit waveforms over a broad enough sector to encompass all of the receive beam directions. The transmitter receives waveforms for the transmit/receive box 405. The transmitter transmits ultrasonic wave 402 to provide a main lobe that is (in this example) approximately 50 degrees wide. In this embodiment, multiple receive arrays 403 may be provided, each of which may be identical or similar to receive array 1101 shown in FIG. 11 or receive array 1201 shown in FIG. 12. See FIG. 4 for one possible configuration using four receive arrays 403. The receive arrays 403 each have a receive capability of approximately 17 degrees in this embodiment (or some other predefined angle). Therefore, each receiver has an overlapping responsibility with the receiver next to it while covering the 50 degrees of transmitted ultrasonic waves. These receivers may be stacked one on top of the other at slightly different angles in order to create this feature. The receivers all provide their reception data to the transmit/receive box 405 so that the reception data may be passed on to a processor for further processing of the return signals.

This configuration reduces noise from unwanted directions (i.e. directions other than the selected 50 degrees for the transmitter for this example by making the side lobes as small as possible).

Figure 5:
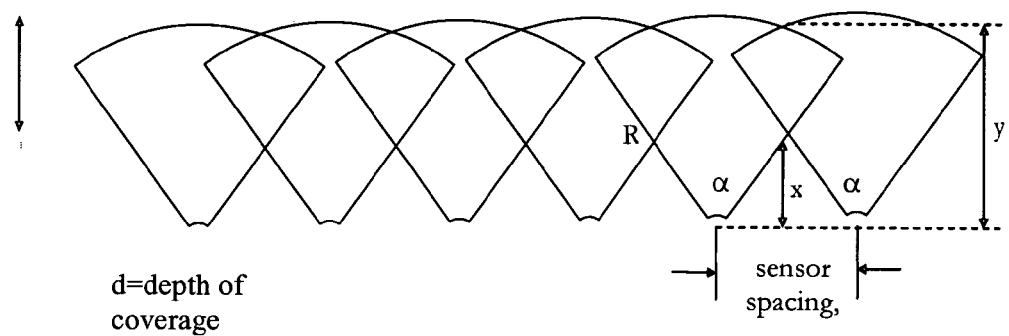
FIG. 5 illustrates the theoretical coverage of a plurality of sensors of the present invention.

FIG. 5 illustrates the coverage of a plurality of sensor arrays. A sensor array with a given sensor spacing and a field of view of angle $\alpha$ may be used with a standoff range of y and a depth of coverage of d. The depth of coverage d is the effective detection area of the sensors. The lower limit of d is the minimum distance of an entire region by multiple waveforms is assured. Integration logic is used to receive the received waveforms and allow several receivers outputs to be processed by one processing module. It is able to combine returns from single targets to multiple arrays into a single target reported to the graphical interface logic. The stand-off range is the range where the return signal is below a predetermined threshold.

Figure 6:
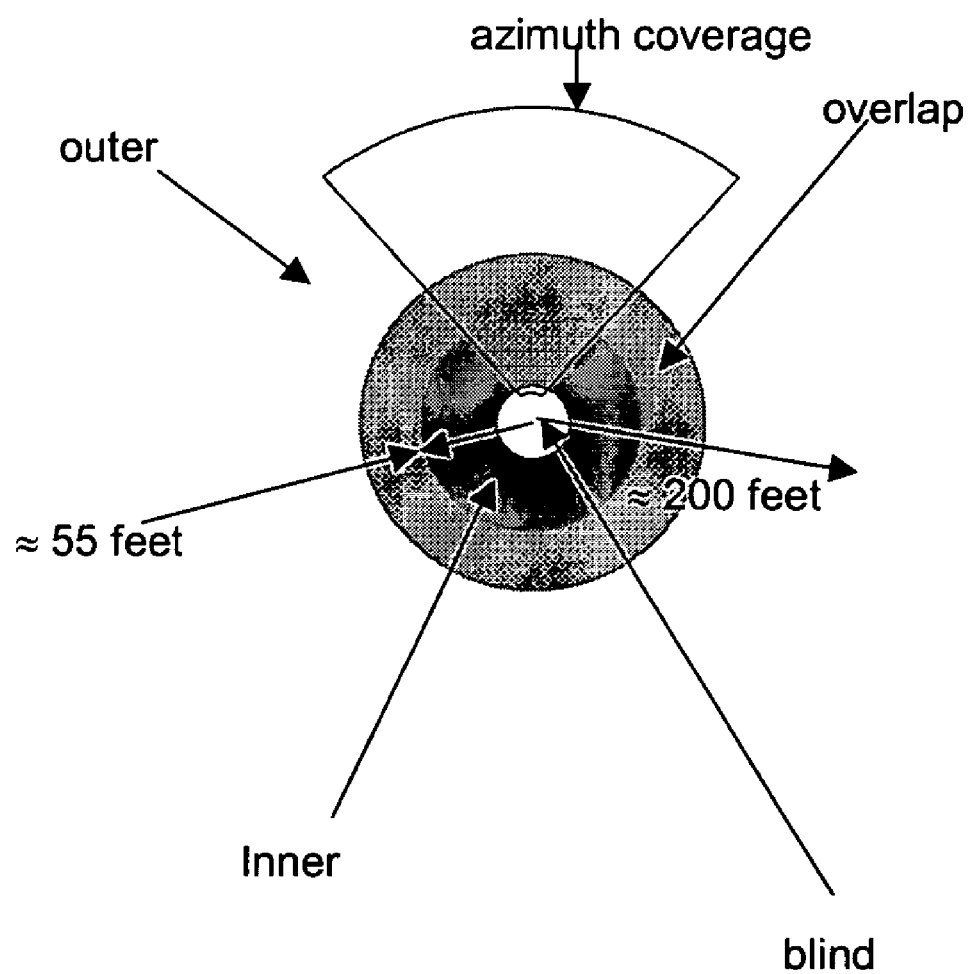
FIG. 6 illustrates the theoretical sensor coverage of one implementation of the present invention.

FIG. 6 demonstrates the theoretical sensor coverage of one implementation of the present invention with waveforms of 100 msec in duration. The waveform with a 100 msec duration produces a blind range (the time during which echoes would be masked by the transmission itself) of 55 feet, so if coverage of this area is to be provided, a short pulse can be interleaved with the longer pulses. This waveform can be sufficiently long to provide detection out to at least 55–60 feet. A 25 msec HFM waveform, which has demonstrated detection to beyond 80 feet, was selected as the waveform to provide close-in coverage. It provides some overlap with the 100 msec waveform and has a blind range of about 14 feet. This interleaving of pulses of various lengths allows for the system to advantageously detect targets over a greater area than would be possible with pulses of one waveform.

Figure 7:
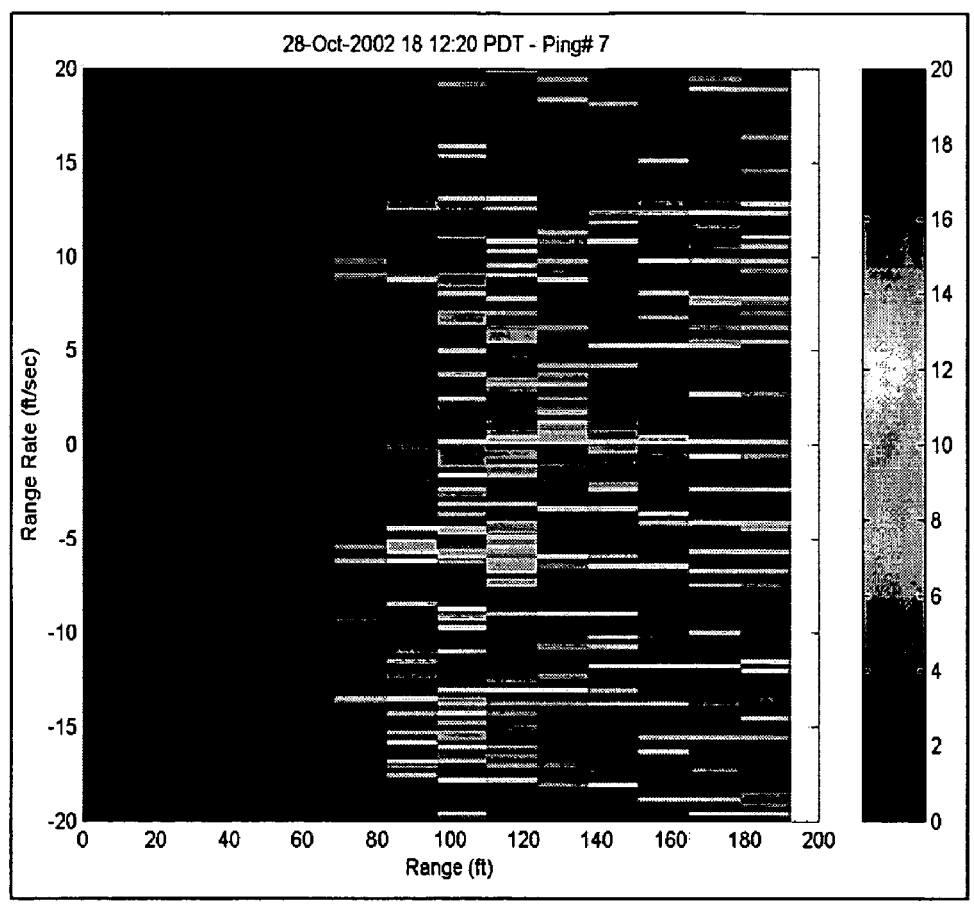
FIG. 7 illustrates a graphical display of a moving human target as viewed by the present invention.

FIG. 7 illustrates a graphical display of a moving human target as viewed by the present invention. The location and level of the various shadings represent the strength of the echo return and the amount of movement of the object as determined by the signal processor. In this example, the target is moving at 20 feet per second.

Figure 8:
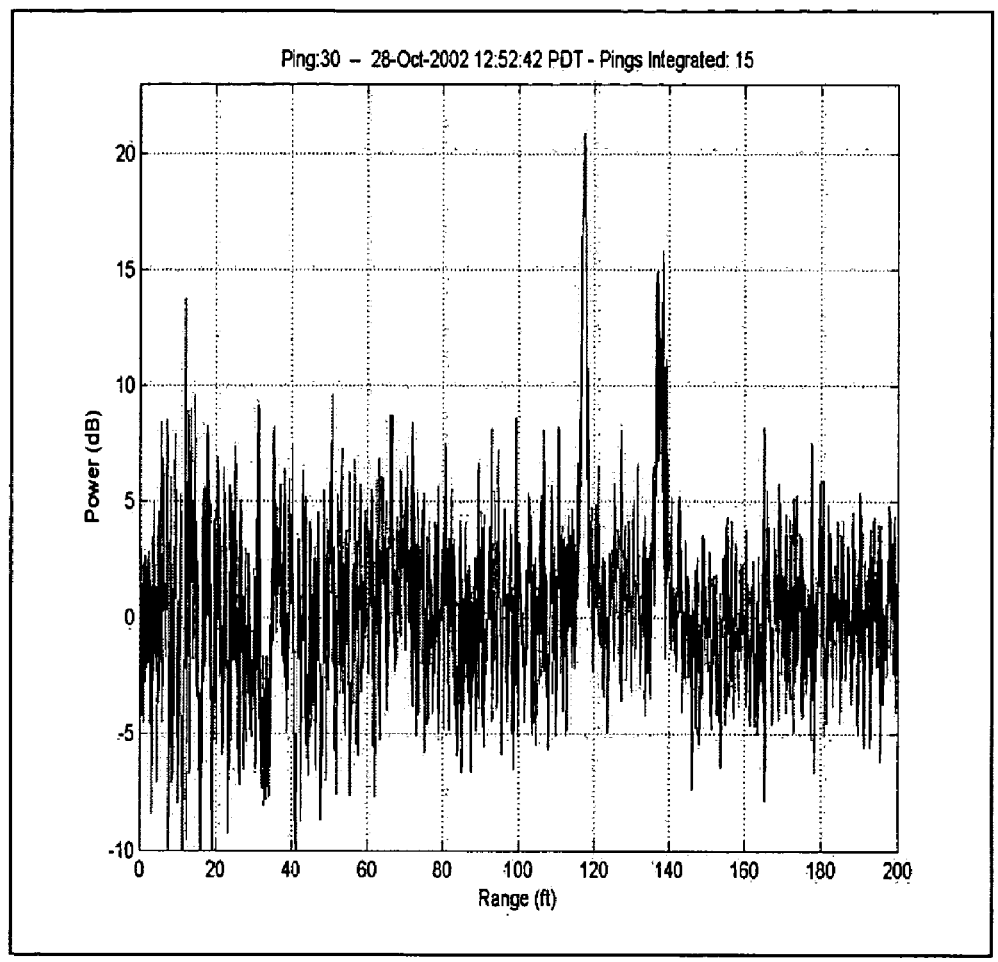
FIG. 8 illustrates a graphical display of two stationary human targets as viewed by the present invention.

FIG. 8 illustrates a graphical display of two stationary human targets as viewed by the present invention. In this example two stationary targets are located at approximate distance of 120 and 140 feet. These targets are specified by the high return level at those distances.

FIG. 9 demonstrates the schematic of an embodiment of a portion of a transmitter module of the present invention. The schematic shows a micro-controller 901 used to generate digital waveform data for the desired waveform at the sample frequency. The digital waveform data from the micro-controller is transformed to an analog signal with a digital to analog converter 902. The resulting analog signal is filtered to eliminate signal content outside the frequency band of interest with an eighth order Band-Pass Filter 903. The filtered transmit signal is then amplified with a solid state amplifier.

FIG. 10 demonstrates the schematic of an embodiment of a transmit array. The schematic shows a five element transmit array, with each element of the transmit array receiving the full amplitude of the transmit signal from the transmitter module described in FIG. 9. The schematic shows the matching networks selected to tailor the response of the individual elements for the desired bandwidth of operation.

FIG. 11 demonstrates the schematic of an embodiment of a receive array. The schematic shows four separate 10-element receive arrays that provide four receive beams at desired angles. Each receive array includes a line array of microphone elements 1102. This schematic shows the use of electret-condenser audio band microphones $MIC_n$ used at ultrasonic frequencies. The outputs of each microphone element in the line array are summed to form a single channel output or beam. The four beam outputs from the array are output for subsequent amplification, analog to digital conversion, and signal processing.

Figure 12:
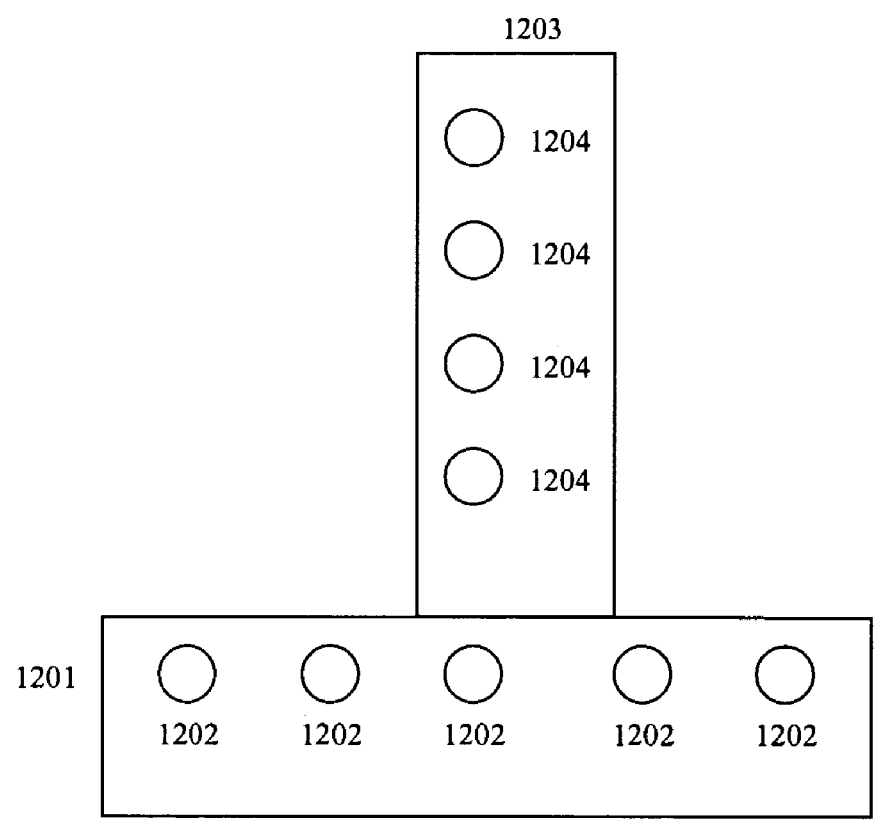
FIG. 12 is a diagram of a transmitter and a receiver oriented perpendicularly to one another.

FIG. 12 is a diagram of a transmitter and a receiver oriented perpendicularly to one another to reduce the reverberation or backscatter in the overall response, which is the intersection of the transmit and receive beams. Receiver array 1201 includes microphone elements 1202 oriented in one longitude (in this case horizontal). Transmitter array 1203 includes transmitters 1204 oriented in a second longitude (in this case vertical). As can be seen the receiver array 1201 and the transmitter array 1203 are oriented perpendicular to one another, which is known as Mills Cross configuration. Generally, the arrays 1201 and 1203 include two or more transmitter and microphone elements respectively.

Figure 13:
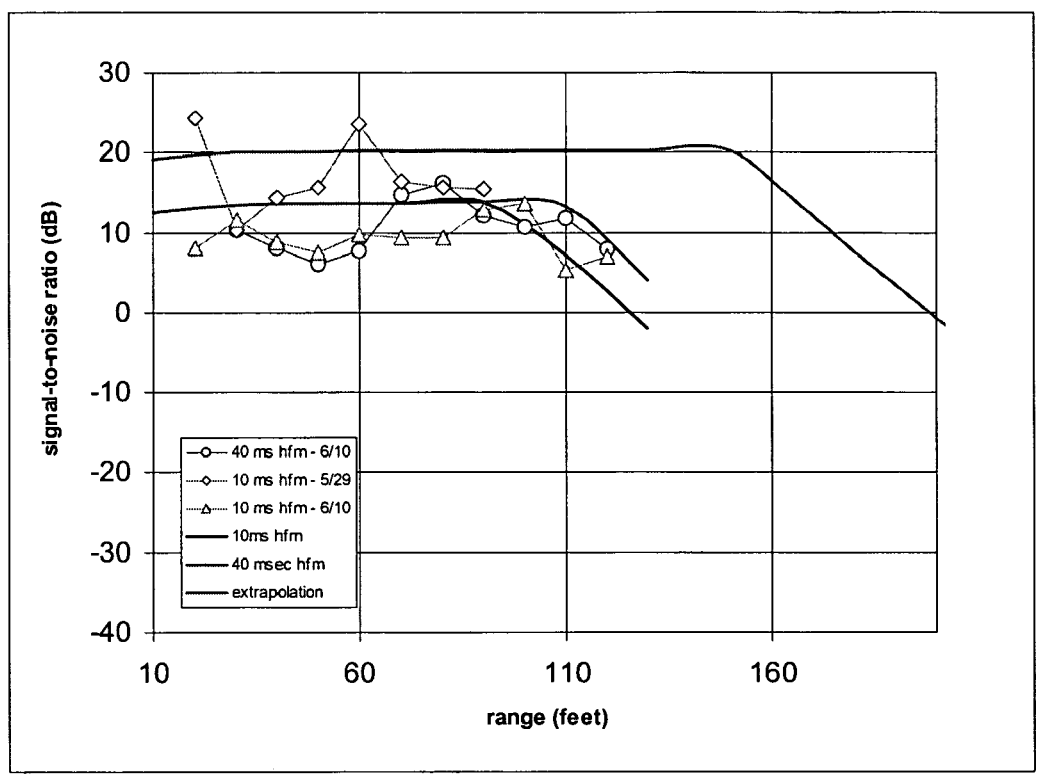
FIG. 13 illustrates a graphical comparison of measured vs. predicted SNR for one implementation of a system according to FIG. 1.

FIG. 13 presents the results of actual field measurements collected using a system including arrays similar to those as described above. The plot shows signal to noise ratio (SNR) at the output of the sensor system versus range to a human target. The black and red curves show theoretical estimates of SNR for the prototype system presently available using (respectively) a 10 millisecond and a 40 millisecond transmit pulse; the performance curves assume nominal environmental conditions. Measured data points from two different test days show that the prototype equipment is achieving the basic level of performance theoretically predicted. The green (diamond shape) curve shows the estimated performance for a system using a higher power transmission, a larger receive array, longer transmit pulses and processing that includes integration across multiple pings.

Some of the benefits that may be realized from the inventive features discussed above include:

1. Use of active ultrasonic sensors for long-range detection, localization and classification;
2. Utilization of high-Q ultrasonic sensor elements to create a multi-element transmit array;
3. Utilization of low-Q audio microphones to create a multi-element, receive array operating in the lower end of the ultrasonic frequency band (these components support electronic steering of the receive beams);
4. Characterization of ultrasonic noise backgrounds, target reflectivity, and environmental scattering levels;
5. A detection capability out to operationally meaningful ranges for detection of a stealthy intruder around a high valued facility (i.e. on the order of several hundred feet);
6. A reliable detection mechanism that:
   i. does not rely on energy radiated by the intruder
   ii. is difficult to spoof
   iii. will not alert stealthy intruders;
7. A detection mechanism that operates via different physical principles than other commonly used in-air surveillance sensors, providing complementary performance in a multiple sensor system;
8. Introduction of an active, covert sensor into in-air, perimeter surveillance systems that provides:
   i. A localization capability that provides range, cross range, and rate range information on targets
   ii. A high resolution capability due to high frequency operation that can provide target features for classification purposes;
9. Operation at high acoustic frequencies for which wavelengths (and the resulting physical array aperture sizes) are small, thus providing a compact sensor system with very low power consumption;
10. A low cost approach to wide area intrusion detection;
11. A system that can exploit a variety of sonar detection processing techniques, including algorithms designed for use in underwater sonar applications, including:
    i. Beamforming on transmit and receive. Sensors are formed into antenna arrays for both increased source level and directivity on transmit, and to support multiple beam processing on receive. The array elements can be processed with a conventional beamformer to provide fixed beams, or with an adaptive beamformer to provide additional interference rejection.
    ii. Multiple sidelobe canceling can be performed with auxiliary array elements to reject plane wave interference
    iii. The use of complex active sonar wavetrains and waveforms to simultaneously test for high and low Doppler targets
    iv. The use of clutter mapping and spatial-temporal normalization techniques to smooth non-uniform responses to background noise
    v. Accommodation of monostatic or bistatic operation, i.e., not requiring that the transmitters and receivers be collocated
12. Can be easily be tailored to different perimeter geometries and a layered defense approach; and
13. Can operate in-air over land or water.

What is claimed is:

1. An object detection system for detecting and identifying targets, including:

a first module having a plurality of acoustic transmitters configured to generate a concatenated ultrasonic wavetrain including a first waveform configured to illuminate a target moving at a first speed and a second waveform configured to illuminate a target either moving at a second speed substantially slower than the first speed or being stationary, the wavetrain being transmitted in air and in a predetermined direction;

a second module having at least one acoustic receiver configured to receive reflected ultrasonic waves originating from the first module after reflection from a target; and target identification logic coupled to the second module and configured to generate an output representative of the target.

2. The detection system of claim 1, wherein the first module includes a plurality of acoustic transmitters and the second module includes a plurality of acoustic receivers.

3. The object detection system of claim 2, wherein:
the acoustic transmitters are positioned in a generally collinear configuration oriented in a first direction;
the acoustic receivers are positioned in a generally collinear configuration oriented in a second direction;
the first direction and the second direction are nonparallel to one another.

4. The object detection system of claim 3, wherein the first direction is substantially perpendicular to the second direction.

5. The object detection system of claim 1, wherein the target identification logic is configured to reduce background noise in the generated output.

6. The object detection system of claim 1, wherein the target identification logic is configured to reduce reverberation in the generated output.

7. The object detection system of claim 1, wherein the first and second modules are configured to minimize energy received at the second module from directions other than a predetermined direction targeted by the transmitter.

8. The object detection system of claim 1, wherein the second module includes at least a first said acoustic receiver and a second said acoustic receiver wherein the first said acoustic receiver is positioned above the second said acoustic receiver.

9. The object detection system of claim 1, further including feature extract logic configured to generate signals representative of at least one physical characteristic of the target.

10. The object detection system of claim 1, wherein the first and second modules are configured to reduce energy from directions other than a predetermined direction targeted by the transmitter.

11. The object detection system of claim 1, further including logic configured to identify targets based upon clusters derived from the reflected acoustic waves.

12. The object detection system of claim 1, wherein the produced ultrasonic waves include concatenated waves of different types.

13. The object detection system of claim 12, wherein the identification logic is configured to reduce reverberation in the generated output.

14. The object detection system of claim 12, wherein the first and second modules are configured to minimize energy received at the second module from directions other than a predetermined direction targeted by the transmitter.

15. The object detection system of claim 12, further including logic configured to correlate data of multiple pings to improve the received data.

16. The object detection system of claim 12, wherein the identification logic is configured to provide cluster analysis of over-resolved echo return from a single object.

17. An area detection system including a plurality of object detection systems for detecting and identifying targets, each object detection system including:
a first module having a plurality of acoustic transmitters configured to generate a concatenated ultrasonic wavetrain including a first waveform configured to illuminate a target moving at a first speed and a second waveform configured to illuminate a target either moving at a second speed that is substantially slower than the first speed or being stationary, the wavetrain being transmitted in air and in a predetermined direction;
a second module having at least one acoustic receiver configured to receive reflected ultrasonic waves originating from the first module after reflection from a target; and
target identification logic coupled to the second module and configured to generate an output representative of the target.

18. The area detection system of claim 17, wherein the generated ultrasonic waves from the respective object detection systems are configured to substantially overlay at a predetermined stand-off range.

19. The area detection system of claim 17, further including integration logic configured to receive the generated outputs from each of the object detection systems and to generate an integrated output representing targets in a predetermined area.

20. The area detection system of claim 19, wherein the integrated logic is configured to eliminate multiple representations of generated ultrasonic waves reflected from a single target.

21. An object detection system including:
(a) a first module having a plurality of acoustic transmitters configured to generate a concatenated ultrasonic wavetrain including a first waveform configured to illuminate a target moving at a first speed and a second waveform configured to illuminate a target either moving at a second speed substantially slower than the first speed or being stationary, the wavetrain being transmitted in air and in a predetermined direction;
(b) a second module having a plurality of receivers configured to receive reflected ultrasonic waves originating from the first module after reflection from a target;
(c) first logic configured to identify targets based upon clusters derived from reflected acoustic waves;
(d) second logic configured to minimize energy received at the second module from directions other than a predetermined direction targeted by the transmitter; and
(e) third logic configured to generate signals representative of at least one physical characteristic of the target and
wherein the acoustic transmitters are positioned in a generally collinear configuration oriented in a first direction;
wherein the acoustic receivers are positioned in a generally collinear configuration oriented in a second direction which is substantially perpendicular to the first direction.

22. A method of acoustically detecting objects, the steps including:
generating a concatenated ultrasonic wavetrain including a first waveform configured to illuminate a target moving at a first speed and a second waveform configured to illuminate a target either moving at a second speed that is substantially slower than the first speed or being stationary, the wavetrain being transmitted in air and in a predetermined direction;
transmitting the generated ultrasonic wavetrain through air towards a target;
receiving ultrasonic waveforms from a set of at least one acoustic receiver configured to receive reflected ultrasonic waves originating from the first module after reflection from the target; and
processing ultrasonic waveforms with target identification logic coupled to the at least one acoustic receiver and configured to generate an output representative of the target.

23. The method of claim 22, further comprising the steps of:
   determining whether the received ultrasonic waves are false alarms.

24. The method of claim 22, wherein the ultrasonic waves are received by an array of receivers.

25. The method of claim 22, wherein the ultrasonic waves are generated by an array of transducers.

26. The method of claim 22, wherein the ultrasonic waves are generated by a single transducer.

27. The method of claim 22, wherein the step of processing the received ultrasonic waves includes identifying targets based upon clusters derived from reflected acoustic waves.

* * * * *

UNITED STATES PATENT AND TRADEMARK OFFICE
CERTIFICATE OF CORRECTION

| | |
|---|---|
| PATENT NO. | : 6,987,707 B2 |
| APPLICATION NO. | : 10/712805 |
| DATED | : January 17, 2006 |
| INVENTOR(S) | : Paul L. Feintuch et al. |

It is certified that error appears in the above-identified patent and that said Letters Patent is hereby corrected as shown below:

On the front page of the patent, item number 73, "Assignee," should read:

--General Dynamics Advanced Information Systems, Inc., Arlington, VA and Technology Focus, LLC, Covina, CA--

Signed and Sealed this

Eighteenth Day of September, 2007

JON W. DUDAS
*Director of the United States Patent and Trademark Office*